SINGLE SIDE BAND RADIO CARRIER RETRIEVAL SYSTEM

Filed March 13, 1962 2 Sheets-Sheet 1

Frequencies (cps)

| | | | | | | | |
|---|---|---|---|---|---|---|---|
| | 10500 | 110500 | 110500 | 610500 | 610500 | 5610500 | 5610500 |
| ±500 | 10000 | 110000 | 110000 | 610000 | 610000 | 5610000 | 5610000 |
| | 9500 | 109500 | 109500 | 609500 | 609500 | 5609500 | 5609500 |
| | | 100000 | | 600000 | | 5000000 | |
| | | 90500 | | 490500 | | 4390500 | |
| | | 90000 | | 490000 | | 4390000 | |
| | | 89500 | | 489500 | | 4389500 | |

3,147,437
Patented Sept. 1, 1964

3,147,437

SINGLE SIDE BAND RADIO CARRIER RETRIEVAL SYSTEM

Cecil A. Crafts, Santa Ana, and Maynard D. McFarlane, Tustin, Calif., assignors to Robertshaw Controls Company, a corporation of Delaware Filed Mar. 13, 1962, Ser. No. 179,451
21 Claims. (Cl. 325—49)

This invention relates to communication equipment and, more particularly, to equipment for the transmission of information through space with an economy of the transmission spectrum and energy.

Normal radio communications comprise the transmission of a carrier, which is of a frequency sufficiently high to readily radiate into space, modulated by the information being transmitted. The resultant radiated signal is a complex wave which can be divided for discussion purposes into the carrier and two side bands, an upper side band and a lower side band. The information being transmitted is contained in both of the side bands. It is usually necessary to also transmit the carrier so that the transmitted signal can be demodulated at the receiving end, and the information contained therein can be recovered. However, since each side band comprises signals which have frequencies equal to the frequency of the carrier plus (in the case of the upper side band or minus in the case of the lower side band) the frequencies of the information being transmitted, it can be seen that the frequency width of the transmission band required for the transmission of the complete signal with both side bands is equal to twice the highest frequency of the information being transmitted. Assume, for example, that voice intelligence in the range of 100 through 10,000 cycles per second is to be transmitted by modulating a carrier wave of a frequency of $10^6$ cycles per second. The upper side band of the transmitted wave ranges between 1,000,100 and 1,010,000 cycles per second, and the lower side band ranges between 999,999,900 and 999,990,000 cycles per second. Thus, the total signal width requires the band lying between 999,990,000 and 1,010,000 cycles per second, which is a band having a width of 20,000 cycles per second.

Since the intelligence being transmitted is contained in both of the side bands and not in the carrier, it would seem logical to transmit only one side band by itself, affording an economy of both channel width and of transmitted energy. This has been attempted, and the transmission is readily achieved. The difficulties in the past have been in recovering the intelligence at the receiver and in the additional distortion introduced by slight variations in the transmission medium.

In recovering information from a modulated wave, it is necessary to utilize the carrier as it was before modulation. Since modulation is the production of variations in the amplitude, frequency or phase of the carrier, in demodulation, the carrier serves as the base from which the extent and form of the deviations may be determined. If the base used in demodulation is not the same as the carrier before modulation, the demodulation usually results in a garbled, unintelligble signal. The problem is, then, to find either an alternative method of demodulation or to reconstruct the carrier at the receiver. In either of these alternatives, solutions have been found, but they generally require the reinsertion of the original carrier signal into the received signal.

This suggests the transmission of one side band and the original carrier. In addition to the larger amount of energy which must be transmitted when the carrier is included in the transmission, slight variations in the transmission medium cause multiple cross- and intermodulations of the carrier and the single side band, usually resulting in the reception at the receiver of a signal which cannot be demodulated. In an effort to overcome this problem, the carrier may be transmitted with a single side band but at a level substantially below that of the side band. The carrier may be at a level 20–30 db below that of the side band. This aids in the elimination of some of the distortion produced by slight phase shifts between the side band and the carrier during transmission, and the weak carrier may be used at the receiver to synchronize a local oscillator at the receiver to that at the transmitter. Also, a signal representative of the carrier but at a frequency which is a submultiple of the carrier frequency may be transmitted with a single side band. The low frequency "carrier" may be then used in a manner similar to the reduced amplitude carrier to synchronize a local oscillator.

Both of these systems require complex and expensive equipment and produce results which may not warrant the expense of that equipment. In the system using the reduced amplitude carrier, the receiver must have sharply tuned radio frequency amplifiers for reproducing enough of the carrier to permit the proper synchronization of a local oscillator to the transmitter oscillator while still rejecting noise at closely adjacent frequencies. Since the two oscillators must be locked in phase as well as frequency, this is often not completely accomplished, and the recovered intelligence periodically fades, in both amplitude and intelligibility. In the system using the lower frequency carrier, several oscillators are used at the transmitter to produce the lower frequency carrier and at the receiver to recover the transmitted carrier. It is difficult to maintain two oscillators in complete synchronism over a period of time, and the use of several oscillators has increased the problem of synchonization.

In view of the obvious advantages of reduced energy requirements of the transmitted signal and the saving of frequencies in the transmission spectrum inherent in the use of single side band systems, it is an object of this invention to provide new and improved single side band transmission systems.

It is another object of this invention to provide new and improved single side band, suppressed carrier communications systems.

It is a further object of this invention to provide new and improved single side band communications systems with less complex equipment and increased stability.

Other advantages and objects of this invention will become apparent to those skilled in the art as the following description proceeds, which description should be considered together with the accompanying drawings in which.

Figure 1:
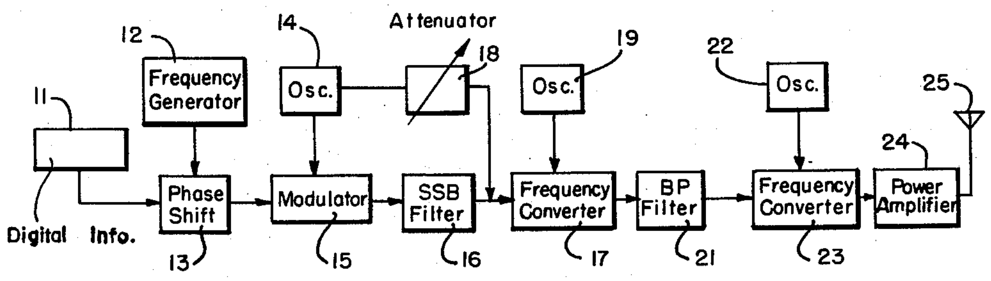
FIG. 1 is a block diagram of a single side band transmitter for use in the system of this invention.

Referring now in detail to the drawings, and in particular to FIG. 1, the reference character 11 designates a source of intelligence to be transmitted, in this case a source of digital information. The output from the source of digital information 11 is in the form of trains of electrical impulses in combinations representative of alpha-numeric information. The presence of a pulse in any position within a character train of pulses is called a mark and the absence of a pulse in any such position is called a space. Since, in this illustration, the information is represented in coded binary form, a modulated signal is simplified into one which assumes either of two possible conditions. In the system of FIG. 1, the two conditions will be two phase conditions, a zero phase and a shifted phase. The signal output from the source of digital information 11 is applied to a phase shifter 13 which is controlled thereby to appropriately shift the phase of a sub-carrier from a frequency generator 12. The output of the phase shifter 13 comprises a signal having the frequency of the sub-carrier periodically varying in phase to either of two phase conditions in accordance with the pulse output from the source of digital information 11. Thus, the output from the phase shifter 13 can be considered the intelligence signal. This equipment is illustrated and described in detail in the copending applications S.N. 731,334, filed April 28, 1958, in the name of M. D. McFarlane and S.N. 755,088, filed August 14, 1958, in the name of C. A. Crafts. An oscillator 14 supplies a radio frequency wave to a modulator 15 wherein it is amplitude modulated by the phase modulated subcarrier output from the phase shifter 13. The modulated wave is applied to a single side band filter 16 which passes only one side band and rejects the other side band and the carrier. At the same time, the output from the oscillator 14 is also applied through an attenuator 18 to the output of the single side band filter 16. The two signals, the single side band and the attenuated carrier, are then applied together to one input of a first frequency converter 17 to which the output from another oscillator 19 is also applied. The output from the first frequency converter 17 is transmitted through a band pass filter 21 and is applied to an input of another frequency converter 23, to which the output of another oscillator 22 is also applied. The output from the second frequency converter 23 is then applied to a power amplifier 24 and to a transmitting antenna 25.

The transmitter of FIG. 1 is a transmitter which transmits not only a single side band but also a greatly attenuated carrier so that the complete signal may be reconstructed at the receiver. In operation, the mark and space output from the source of digital information 11 cause the phase shifter 13 to modify the phase of the sub-carrier from the frequency generator whenever, say, a mark is applied. In other words, the output from the phase shifter comprises a wave having the frequency of the sub-carrier and also side bands representing the rate of the sudden phase shifts in accordance with the generation of the marks and spaces by the teletype machine 11. This is the wave which conveys the intelligence to be transmitted. In normal fashion, the signal output from the phase shifter 13 is used to modulate a carrier wave generated by a high frequency oscillator 14. The modulation is performed in the amplitude modulator 15. To reduce the problems of filtering so as to recover only the single side band, it is better to use a carrier having a frequency, as generated by oscillator 14, which is within an order or two of the frequency of the sub-carrier generated by the frequency generator 12. The single side band filter can then be less critical and still readily distinguish between the carrier signal and the side bands. The output from the single side band filter 16 consists of a single band only, say the upper side band. This single side band contains signals which represent the carrier frequency plus each intelligence frequency. In this case, since the intelligence is represented by the phase shift of the subcarrier the upper side band consists of a signal which is the sum of the carrier frequency and the frequencies of the sub-carrier and its side bands. Since it is contemplated that the carrier frequency be within an order or two of that of the intelligence, the frequency of the output signal must be multiplied to that of the allocated frequency band assigned for the particular transmission. The frequency converters 17 and 23 are used for this. The oscillator 19 generates a signal having a frequency several times that of the frequency of the carrier or the single side band, and when the two signals are heterodyned in the frequency converter 17, the resultant output includes the sum of the two input frequencies. A highly attentuated carrier is also applied to the input of the frequency converter 17 so that the output therefrom contains not only signals representing the sum of the frequencies of the single side band and the oscillator 19, but also of the oscillator 19 output and the carrier. The band pass filter 21 permits only the sum frequencies to pass to the second frequency converter 23 where the single side band and the carrier wave are again beat with a higher frequency signal generated by the oscillator 22. The output is applied to a power amplifier 24, which is preferably tuned to the sum frequencies, and after amplification, is radiated by antenna 25.

In addition to increasing the frequency of the signal, the conversions may also increase the amplitude of the signal. In any case, since the transmitted signal contains only a full strength single side band and a greatly attenuated carrier, the amount of energy that is radiated into space is substantially less than would be required for a signal which comprised both side bands and a full strength carrier. In addition, since the intelligence is contained in a phase shifted low frequency signal, the band width of the transmitted signal is quite narrow, permitting more transmissions in a limited spectrum.

Figure 2:
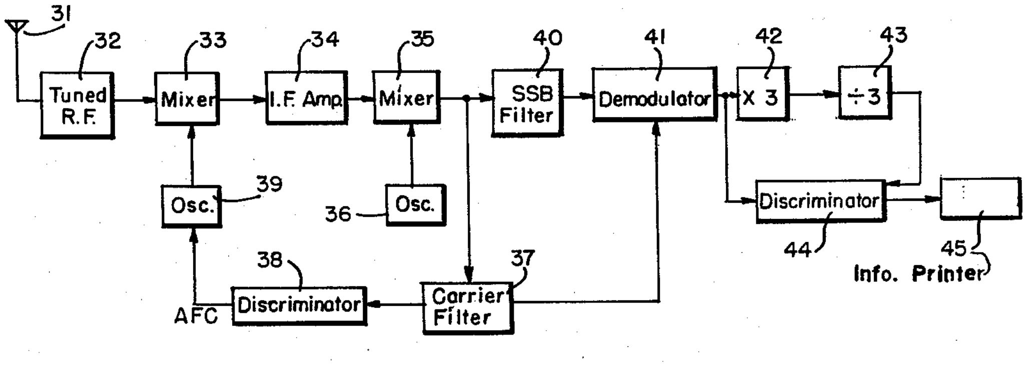
FIG. 2 is a block diagram of a single side band receiver suitable for use with the transmitter of FIG. 1.

To demodulate the transmitted signal of the apparatus of FIG. 1, the carrier can be heterodyned with the side band, and the difference signals recovered. This difference signal represents the original intelligence. In the receiver of FIG. 2, the signal radiated from antenna 25 of FIG. 1 is received by a receiving antenna 31 and is transmitted to tuned radio-frequency stages 32. The output of the radio frequency stages 32 is applied to a mixer 33 which also receives the output from an oscillator 39. The multifrequency output from the mixer 33 is amplified in a tuned intermediate frequency (I.F.) amplifier 34 and applied to a second mixer 35 which is supplied also by an oscillator 36. The output from the second mixer 35 is simultaneously applied to two paths, one to a single side band filter 40 and the other to a carrier filter 37. The carrier filter 37 is tuned to the frequency of the transmitted carrier wave and permits only that single frequency signal to pass. The output of the carrier filter 37 is applied to a frequency discriminator 38 which produces an output potential proportional to the deviation of the applied signal from its center frequency for controlling the frequency output of the oscillator 39. The output of the carrier filter 37 is also applied to a demodulator 41 together with the single side band output from the single side band filter 40. The phase modulated sub-carrier recovered in the demodulator 41 is then applied to an arrangement of a frequency multiplier 42 in series with a frequency divider 43 and to one input of a phase discriminator 44. The other input of the phase discriminator 44 is connected to the frequency divider 43. A digital information printer 45 receives the amplitude output from the phase discriminator 44. The arrangement of the frequency multiplier 42, frequency divider 43 and discriminator 44 is illustrated and described in detail in Patent 2,991,354, issued to C. A. Crafts on July 4, 1961.

In operation, the receiver of FIG. 2 receives the single side band transmission from the transmitter of FIG. 1 in the antenna 31 and amplifies it in the tuned radio frequency amplifier 32, excluding unwanted signals and noise of adjacent frequencies. The single side band transmission is then heterodyned in the mixer 33 with the output of the oscillator 39 to produce signals which include the difference of said single side band signal and the output from the oscillator 39. Since it is important that the phase and the frequency of the oscillator 39 be closely related to the carrier transmitted by the transmitter, the oscillator is controlled by an automatic frequency control potential generated in the frequency discriminator 38. To derive the carrier component of the single side band transmission, the output from the mixer 33 is applied to the tuned intermediate frequency amplifier where the difference signals are amplified and applied to a second mixer 35. In the second mixer 35, the difference signals are heterodyned with a continuous wave generated by the oscillator 36. The output from the mixer 35 contains signals having the frequency of the output from the oscillator 36 as well as the difference between that signal and the input from the amplifier 34. The output from the mixer 35 is applied to both a single side band filter and the carrier filter 37. The low level carrier signal should pass through the filter 37 and be applied to the discriminator 38. The potential output of the discriminator 38 should modify the output from the mixer 33 by controlling the frequency of the oscillator 39 to bring the carrier passed by the filter 37 into synchronism with the output of the oscillator 14 of the transmitter. This, then serves to recreate the carrier signal at the receiver. In addition to controlling the oscillator 39 and the output from the mixers 33 and 35, the output from the carrier filter 37 is also applied to the demodulator 41 together with the output from the single side band filter. When the receiver has become synchronized with the transmitter so that the output from the carrier filter 37 is a duplicate of the carrier generated by the oscillator 14, the single side band passed by the filter 40 should be a duplicate of the single side band signal output of the filter 16 in the transmitter. When the carrier output from the filter 37 and the single side band output from the filter 40 are then both applied to the demodulator 41, the resultant output will be the phase modulated sub-carrier which was produced in the phase shifter 13 in the transmitter. This phase modulated sub-carrier signal is then applied to the phase demodulator which includes the frequency multiplier 42, the frequency divider 43 and the discriminator 44 as discussed in the above mentioned Patent 2,991,354 to Crafts. The output from the discriminator 44 is the original intelligence and is applied to the teletype-writer 45 to be printed out.

So far, equipment which uses a single side band and a carrier of low amplitude to transmit and recover information has been described. As pointed out above, there are disadvantages to this type of operation. In transmission through space, slight changes in the properties of the transmitting medium, electrical and magnetic phenomena which vary with time and distance, and both natural and manufactured electromagnetic fields will distort or modify the transmitted wave. When the noise reaches the same amplitude as the carrier, the carrier may be effectively submerged in the noise. If this condition exists for a period of time, the receiver oscillator 39 will drift, and the signal recovered by the receiver may become gibberish.

One manner in which this problem can be solved is to provide both the transmitter and the receiver with synchronized, highly stable oscillators which do not drift during an extended period of time. The most apparent problem in this type of system is the concurrent use of several oscillators in both the transmitter and the receiver. It is difficult, but not impossible to maintain two oscillators in step, but with the addition of each new oscillator, the chance of maintaining synchronism rapidly decreases.

Figure 3:
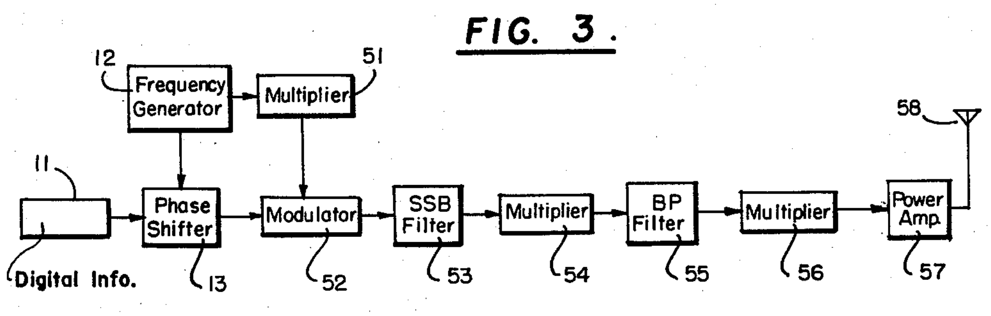
FIGS. 3 and 4 are block diagrams of modified forms of transmitters for use in the single side band system of this invention.

The transmitter of FIG. 3 illustrates one form of equipment which overcomes this problem. Again, the source of intelligence is a source of digital information 11 which generates trains of electrical pulses in combinations of marks and spaces to represent alpha-numeric information. The output from the source of digital information 11 is applied to one input of the phase shifter 13 to key the shifter, and the sub-carrier output of a frequency generator 12 is applied to the other input of the phase shifter 13. The output from the phase shifter 13 is applied to a modulator 52. The output of the frequency generator 12, in addition to being applied to the phase shifter 13 where it is phase modulated, is also applied through a frequency multiplier 51 to a second input of the modulator 52. From the modulator 52 a signal which comprises the frequencies of the sub-carriers, the output of the multiplier 52, and the sum and difference of those signals, is applied to a single side band filter 53, and only one side band, in this case assume the upper side band, reaches a second frequency multiplier 54. The output from the second multiplier 54 is passed through a band pass filter 55 to remove any vestigial signals still attached, and reaches a third frequency multiplier 56. The finally multiplied signal is amplified in the power amplifier 57 and is applied to antenna 58.

The operation of the source of digital information 11, the frequency generator 12 and the phase shifter 13 is the same as explained above in connection with the description of FIG. 1. As the trains of pulses are generated by the source of digital information 11, they are applied to the phase shifter 13 to key the shifter and phase modulate the sub-carrier signal applied to the phase shifter 13 by the frequency generator 12. The phase shifter 13 provides an output signal which has either of two fixed phase relations, one can be considered an unshifted phase and the other a shifted condition. The frequency of the sub-carrier is multiplied by the frequency multiplier 51 and is applied as a carrier signal to the modulator 52 where it is amplitude modulated by the output from the phase shifter 13. This provides an amplitude modulated signal with abrupt phase shifts as the output from the modulator 52. Since this modulated signal contains an upper side band, a lower side band, and the signal output from the multiplier 51, it is passed through a single side band filter 53 where all but a single side band, say the upper side band, is removed. The signal output from the single side band filter 53 is essentially the signal which is to be transmitted, but at a frequency below the specified transmission frequency. To raise the signal to the transmission frequency, the signal output from the filter 53 is applied to a frequency multiplier 54. The high frequency signal is then filtered in a band pass filter 56 to remove extraneous signals which might have passed earlier stages, is again multiplied in frequency by a frequency multiplier 56, is filtered and amplified in a final power amplifier 57, and is radiated into space by antenna 58.

The transmitter of FIG. 3 uses but a single oscillator, that of the frequency generator 12. The sub-carrier output from this oscillator is at a comparatively low frequency and the oscillator may readily be one which can be maintained within close limits of frequency drift for long intervals of time. In order to raise the frequency of the sub-carrier to that desirable for transmission through space, this signal first has its frequency increased to provide a carrier for modulation and the then modulated carrier has its frequency increased many times by several frequency multipliers 51, 54 and 56. Of course, it is realized that the use of three frequency multipliers in the systems of this specification is but illustrative and that the number of multipliers used and the amount of multiplication accomplished by each is but a matter of design for the individual installation. In the transmitter of FIG. 3, as the frequency of the modulated signal is multiplied by passage through the frequency multipliers 54 and 56, the side bands of the phase shifted sub-carrier are also multiplied by a similar amount. This increases the width required of the transmission band.

Figure 4:
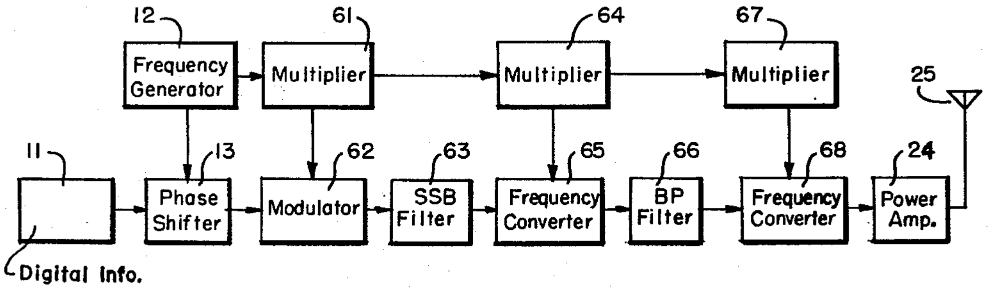

One manner in which this disadvantage can be overcome is illustrated in FIG. 4, a block diagram of a transmitter which is a modified form of the one shown in FIG. 3. Again, the source of intelligence is the source of digital information 11 which generates a stream of pulse positions in which pulses are present and absent in combinations representative of alpha-numeric information. The frequency generator 12 supplies a continuous wave sub-carrier signal of a suitable frequency to the phase shifter 13, and the sub-carrier is shifted in accordance with the intelligence output from the source of digital information 11 which is also applied to the phase shifter 13. A frequency multiplier 61 receives the output from the frequency generator 12 and multiplies the frequency of the sub-carrier so that it is one or two orders higher than the output from the frequency generator 12. The phase modulated output from the phase shifter 13 and the multiplied output from the frequency multiplier 61 are applied to the modulator 62 to produce an amplitude modulated output. The modulated output from the modulator 62 is applied to a single side band filter 63, and the filtered output from the filter 63 is applied to a frequency converter 65. Also applied to the frequency converter 65 is a signal which has been received from the frequency multiplier 61 and passed through a second frequency multiplier 64. The resultant output signals from the frequency converter 65 are passed through a band pass filter 66, and the filtered signal is applied to a frequency converter 68 together with the output from a frequency multiplier 67, through which the signal output from the second frequency multiplier 64 has been passed. The output from the frequency converter 68 is amplified in the power amplifier 24 and applied to antenna 25 for radiation into space.

The operation of the transmitter of FIG. 4 differs from that of FIG. 3 in the means used to raise the frequency from that of the frequency generator to that required for transmission by antenna 25. In the transmitter of FIG. 3, the several multiplications in the frequency of the modulated signal results in similar multiplication of the side bands of the phase modulated sub-carrier, increasing the effective band width required. One of the basic advantages of the phase modulation method of intelligence transmission is the narrow band width required for its transmission. The transmitter of FIG. 3, therefore, does not permit the full utilization of the phase modulation. In FIG. 4, the transmitter source of intelligence is again shown as the Teletype machine 11 which feeds one input of the phase shifter 13 while the frequency generator 12 feeds the other input of the phase shifter 13. The signal output from the frequency generator 13 is fed to a series of frequency multipliers (61, 64, and 67) in cascade. The outputs from each of these frequency multipliers is applied to one input of a frequency converter (62, 65, and 68, respectively). At the same time, the modulated signal output from the modulator 62 is applied to a chain of filters interspersed with the frequency converters. The final output of the frequency converter 68 is applied to the power amplifier 24 and then to the antenna 25.

The transmitter of FIG. 4 solves many of the same problems that the transmitter of FIG. 3 solves, and it also maintains the band width required for transmission at a minimum. Only a single oscillator, the frequency generator 12, is used. The natural output frequency of the frequency generator 12 is used as the sub-carrier signal which is phase shifted by the keying pulses from the source of digital information 11. In addition to serving as the signal which is phase shifted in accordance with the intelligence to be transmitted, the output from the frequency generator 12 is increased in frequency by the frequency multiplier 61 and is used as the carrier which the phase shifted sub-carrier amplitude modulates. The output of the modulator 62 contains not only the upper side band which is desired, but also the output from the frequency multiplier 61 and the lower side band. To eliminate the undesirable lower side band and the "carrier," the products of the modulation are applied to the single side band filter 63 and only the upper side band is then transmitted to the frequency converter 65. Since the carrier frequency was selected for ease of modulation and not for ease of transmission, it must be raised in frequency to that of the transmission channel over which the information is to be sent. In the transmitter of FIG. 3, this was accomplished by successive stages of frequency multiplication and filtering. In this transmitter, only the output of the frequency generator 12 is multiplied in frequency by passage through successive frequency multipliers 64 and 67. The outputs of the frequency multipliers are used to change the frequency of the carrier by heterodyning in frequency converters 65 and 68. By appropriate filtering at the outputs of the frequency converters 65 and 68, the desired signals are passed and the others are rejected. The power amplifier 24 is a tuned amplifier to accomplish the desired filtering action. Thus, the carrier frequency is raised from that appearing at the output of the modulator 62 to the frequency necessary for transmission by heterodyning the carrier with higher frequency derivations from the frequency generator, and by selecting the sum signals for further transmission. In this manner, the carrier frequency is raised without also multiplying the frequency of the intelligence being transmitted. The width of the transmission path does not increase with the increase in the carrier frequency. Thus, the transmitter of FIG. 4 accomplishes the basic requirements of a single side band transmitter with only one oscillator.

Figure 5:
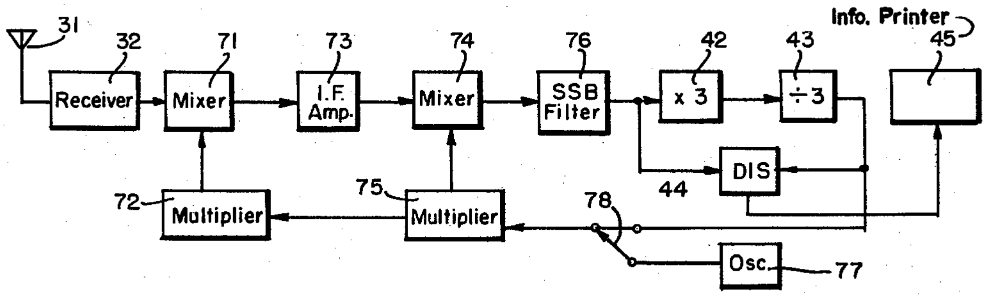
FIG. 5 is a block diagram of a receiver for use with the transmitters of FIGS. 3 or 4.

The problems of reception and recovery of the intelligence still remain. One manner in which these problems can be combated is shown in FIG. 5. The receiver of FIG. 5 comprises a receiving antenna 31 which is connected to the input of a "receiver" 32. The broad term receiver is used to denote any necessary radio frequency amplifiers, tuning means, and other known equipment for deriving an input signal of sufficient amplitude for subsequent operations. The output of the receiver 32 is applied to the input of a mixer 71. The other input of the mixer 71 is supplied with a high frequency signal from a frequency multiplier 72, which, in turn, is supplied with a signal from another frequency multiplier 75. From the mixer 71, the several output signals are amplified in an intermediate frequency amplifier 73 and the amplified intermediate frequency signal is applied to a second mixer 74 to which the output from the other frequency multiplier 75 is also applied. The output from the mixer 74 is passed through a filter 76 and to the demodulating system comprising frequency multiplier 42, frequency divider 43 and discriminator 44. The output from the discriminator 44 is applied to a digital information printer 45, and the output from the frequency divider 43 is also applied to the input of the frequency multiplier 75. An oscillator 77 is selectively connected to the input of the frequency multiplier 75 through a switch 78.

When the receiver of FIG. 5 is first operated, the auxiliary oscillator 77 is connected into the circuit by the switch 78. Once the receiver is operating properly, it becomes self-sustaining, and switch 78 is opened to remove the oscillator 77 from the system. The oscillator 77 is tuned to the frequency of the frequency generator 12 of the transmitters of either FIG. 3 or 4. This frequency is multiplied in the frequency multiplier 75 to the same value as the output from the frequency multiplier 64 of FIG. 4. The signal passed through the frequency multiplier 72 is then raised to the same frequency as the output from the frequency multiplier 67 of FIG. 4. The raised frequency continuous wave from the frequency multiplier 72 is used to beat the incoming amplified signal from the receiver 32 in the mixer 71. The output from the mixer 71 includes a component which is the same as the signal input to the frequency converter 68 of FIG. 4. By applying the output from the mixer 71 to an intermediate frequency amplifier which is tuned, the signal is not only amplified, but the unwanted components are discarded and only the desired signal is passed to the mixer 74. The mixer 74 has applied to it the lower frequency signal from the frequency multiplier 75 and its output contains lower frequency signals than the output from the mixer 71. The output from the mixer 74 includes the signal corresponding to the input to the frequency converter 65 of FIG. 4. The single side band filter 76 removes all but the desired signal from the output of the frequency converter 74 and passes to the demodulator a signal which is the equivalent of the signal output from the modulator 62 of FIG. 4 and the modulator 52 of FIG. 3. The demodulator operates in the manner described in detail in Patent 2,991,354 to C. A. Crafts and will not be further described herein. The output from the demodulator, that is, the output from the discriminator 44 is the intelligence first applied to the system by the source of digital information 11 in FIGS. 3 and 4 for transmission, and is applied to the digital information printer 45 to be printed out. At the same time, the output from the frequency divider 43 is the original sub-carrier frequency generator signal of FIGS. 3 and 4 and is applied to the frequency multiplier 75 to be raised to the proper frequency for application to the mixer 74. Thus, once the system is operating, there is no need for the oscillator 77. This oscillator is used to supply a signal for initial operation when there is not yet an output from the frequency divider 43.

Figure 6:
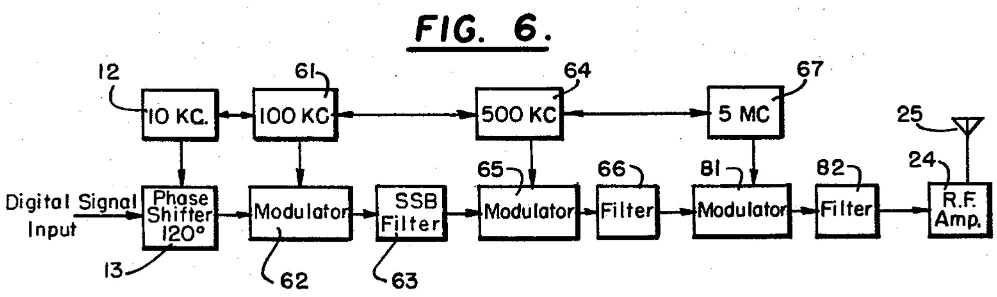
FIG. 6 is a block diagram of a transmitter for use in the system of this invention with appropriate legends to illustrate the operation of the system.

The operation of the entire system of the transmitter of FIGS. 3 and 4 and the receiver of FIG. 5 can probably be better understood by a consideration of FIG. 6 which illustrates the transmitter of FIG. 4 with examples of the frequencies which can be used. Assume, for this example, that the allotted transmission frequency is 5.610 megacycles per second, that the sub-carrier frequency is 10 kilocycles per second, and that the rate at which the pulses are generated by the source of digital information (keying rate) is 500 c.p.s.

Now, referring to FIG. 6, the input to the phase shifter 13 from the source of digital information (not shown in this figure) is 500 c.p.s. To denote this frequency, the symbol ±500 appears beneath the input to the phase shifter 13. The phase shifter 13 is constructed to produce a change in the phase of the sub-carrier signal (output from the frequency generator) of 120° for each input pulse from the teletype machine. The output from the frequency generator 12 is applied to the other input of the phase shifter is $10^4$ c.p.s. Thus, the sub-carrier is modified in the phase shifter 13 at the rate of 500 c.p.s. to produce the sub-carrier frequency of 10,000 c.p.s. and the two side bands of 10,500 c.p.s. and 9,500 c.p.s. in the output. As in the transmitter shown in FIG. 4, the output from the frequency generator 12 is applied to a frequency multiplier 61 to raise its frequency to a value suitable for modulating. In FIG. 6, the frequency multiplier 61 raises the frequency of the sub-carrier by one decimal order, from $10^4$ c.p.s. to $10^5$ c.p.s. When the output from the phase shifter 13 and the output from the frequency multiplier 61 are combined in the modulator 62, the output of the modulator includes signals having the frequencies shown below the modulator in FIG. 6. In order to reduce the amount of energy to be transmitted and the width of the transmission band required, the signals are applied to the single side band filter 63 where all but the upper side band are eliminated. The frequency multiplier 64 increases the frequency of the output from the frequency multiplier 61 from $10^5$ c.p.s. to $5\times10^5$ c.p.s. It must be appreciated that although the blocks 61, 64, and 67, and the other similar blocks in this specification are shown and characterized as single frequency multipliers, they may, in fact, consist of any suitable number of individual frequency multiplier stages to accomplish the desired results. In addition, any well-known frequency multipliers may be used. The upper side band from the modulator 62 and the $5\times10^5$ signal output from the frequency multiplier 64 are mixed in the modulator 65 producing the signals listed therebelow. Again, there is a center frequency signal and upper and lower side bands. Since only the upper side band is desired, the entire signal output from the modulator 65 is applied to the filter 66 and only the upper side band is applied to the input of the modulator 81. In the third frequency multiplier 67, the output from the second frequency multiplier 64 is again increased by a decimal order from $5\times10^5$ to $5\times10^6$ c.p.s. This higher frequency signal is applied to the modulator 81 together with the output from the filter 66 and the resultant group of signals is filtered in filter 82 to remove all but the upper side band which is applied to the power amplifier 24 for amplification, and thence to the antenna 25 for transmission through space. From the numbers appearing below the individual component of the system, it is possible to observe what happens to the signals as they pass through the entire transmitter.

To succinctly analyze the transmitter, the basic signal of $10^4$ c.p.s., which is generated by the single oscillator, is applied to two paths simultaneously. In a first path the frequency of the signal is successively raised in steps to that of the allocated transmission channel. In the other path, the signal is keyed by the intelligence and is then used to serve as a carrier which is modulated by the keyed signal. The modulated signal is then successively heterodyned with the separate signals of the first path, filtering out all but the sum signals. The band width of the keyed sub-carrier which is created in the phase shifter 13 is $10^3$ c.p.s.; from 10,500 to 9500 c.p.s. The band width of the finally radiated signal is the same, from 5,610,500 c.p.s. to 5,609,500 c.p.s., even though the carrier frequency has been multiplied 50 times.

In summary, the single side band transmission system of this invention is capable of transmitting a single side band of modulated signal with a minimum of energy and a minimum of band width. A single oscillator may be used in the transmitter, and once reception has been established, few high precision oscillators are required in the receiver, the demodulated received signal serving to reconstruct the carrier for demodulation purposes. Since as few as a single oscillator may be used in the entire system, the problems of synchronization are greatly reduced. In addition, since only a single side band is transmitted either without a carrier or with only a carrier of low level, variations in the impedance of the transmission medium do not affect the single side band and the carrier the same, and cross or phase modulation effects of signal components are not experienced, resulting in clear, undistorted reception. The components of the system of this invention have been shown in block form since they, in themselves, are not new. Reference has been made where necessary to copending patent applications or to issued patents for the details of structure of those components which are not necessarily old and well-known. For the structure and operation of circuit elements of the system such as oscillators, frequency multipliers, filters, and the like, reference may be made to standard texts in the art such as Ultra-High-Frequency Techniques, by Brainerd, Koehler, Reich and Woodruff, published by D. Van Nostrand Co. of New York, 1942; and Communication Engineering, by W. L. Everitt, published by McGraw-Hill Book Co. of New York, in 1937.

Since this specification may suggest to those skilled in the art other forms in which the invention might be used without departing from the spirit or principles thereof, it is intended that this invention be limited only by the scope of the appended claims.

What is claimed is:

1. A single side band transmission system comprising a receiver and a transmitter, said transmitter comprising means for generating a low frequency continuous wave, means for phase-shift modulating said low frequency continuous wave in accordance with digital intelligence to be transmitted, means for generating a low frequency carrier wave, means for amplitude modulating said carrier wave with said phase-shift modulated continuous wave, filter means for eliminating all but one side band from said amplitude modulated wave, and means for increasing the frequencies and amplitude of said single side band to the values required for transmission; said receiver comprising means for receiving and amplifying the single side band transmission of said transmitter, means for creating several continuous wave signals of prescribed frequency relation to each other including a signal equivalent to the low frequency carrier of said transmitter, first means for heterodyning said amplified received single side band transmission with the created continuous wave of the highest frequency, means for recovering the difference signals from said first heterodyning means, additional cascaded heterodyning means for heterodyning the difference frequency signal from the output of the adjacent heterodyning means with the adjacent created continuous wave signals in descending order of frequency, and means for demodulating the output from the last of said heterodyning means using the signal equivalent to the low frequency carrier of said transmitter to recover the original intelligence.

2. A single side band transmission system comprising a single side band transmitter and a receiver therefor; said transmitter comprising a source of low frequency energy phase-shift modulated with the digital intelligence to be transmitted, means for creating a carrier wave, means for modulating said carrier wave with said low frequency phase-shift modulated energy to produce a signal having a component with the frequency of said carrier wave and components with frequencies of the sum and the difference of the frequencies of said carrier wave and said low frequency phase-shift modulated energy, means connected to the output of said modulating means for passing only the sum component, and successive means for increasing the frequency of said sum component to the desired transmission frequency; said receiver comprising means for receiving said single side band transmission from said transmitter to the exclusion of other unwanted signals, separate means for heterodyning said received single side band transmission with waves of successively decreasing frequency, means adjacent the output of each of said heterodyning means for passing only the difference signals from said heterodyned output to reduce the frequency of said single side band transmission in steps to the same frequency as the original phase-shift modulated low frequency energy, a plurality of means for creating individual continuous waves each of a frequency lower than the preceding for application to the individual heterodyning means, means for deriving from the single side band transmission signals for controlling the frequency of said creating means and means for recovering from said recovered phase-shift modulated low frequency energy the intelligence being transmitted.

3. A single side band transmission system comprising a single side band transmitter and a single side band receiver; said transmitter comprising a source of continuous wave energy of a comparatively low first frequency, means for increasing the frequency of said continuous wave energy to a second frequency, first means for phase-shift modulating said first frequency energy with digital intelligence to be transmitted, second means for amplitude modulating said second frequency energy with said phase-shift modulated energy, filter means connected to the output of said second modulating means for rejecting all of the modulation products but a single side band, and means for increasing the frequencies of the signals in said single side band by the same factor in at least one step to the frequency of a designated transmission channel; said receiver comprising means for receiving said single side band transmission from said transmitter, means for creating a series of continuous waves bearing a prescribed frequency relation to each other, at least one means for heterodyning said received single side band with at least one of said created continuous waves to generate a plurality of heterodyning products which includes the output from said transmitter filter means, means connected to the output from heterodyning means for controlling the recreation of said second frequency signal, and means using said recreated second frequency signal for recovering said transmitted digital intelligence from said heterodyning products.

4. A single side band transmission system comprising a single side band transmitter and a single side band receiver; said transmitter comprising a source of comparatively low first frequency continuous waves; means for modifying said first frequency waves in accordance with digital intelligence to be transmitted; means for multiplying the frequency of said first frequency waves to a second higher frequency; modulating means to which the output from said multiplying means and the modified first frequency waves are applied and in which said modified first frequency waves amplitude modulate the output from said multiplying means to form modulation products called a sum component, a difference component and a carrier component; filter means connected to the output of said modulating means for rejecting said difference component and said carrier component but passing said sum component; and means for increasing the frequencies contained in said sum component to frequency levels suitable for transmission.

5. The single side band system defined in claim 4 wherein said receiver comprises means for receiving the single side band transmission from said transmitter, means for lowering the frequencies contained in said single side band reception to the frequencies produced by modulation in said transmitter, and means for demodulating said reduced frequency side band reception, the demodulating means including means for creating a continuous wave of said second frequency, means for deriving said first frequency modified wave from said single side band reception by using said created second frequency continuous wave, means for demodulating said first frequency modified wave to recover the intelligence transmitted and said first frequency continuous wave, and means for using said recovered first frequency continuous wave to control the creation of said second frequency continuous wave.

6. A single side band transmitter for generating single side band signals to be transmitted and convey intelligence, said transmitter comprising a source of a low first frequency continuous wave, means for increasing the frequency of said first frequency continuous wave from said first frequency to a second frequency which bears a predetermined relation to said first frequency, means for modifying at least a portion of said first frequency continuous wave with the intelligence to be conveyed, means for modulating said second frequency continuous wave with said modified first frequency continuous wave to produce modulation products which include a sum component and a difference component, means for rejecting all but one of said sum and difference components and permitting the non-rejected component to pass, frequency multiplying means for increasing by a prescribed amount the frequencies contained in said passed component to the frequency range required for transmission, and means for raising the amplitude of said higher frequency signals to a value suitable for transmission.

7. The system defined in claim 6 wherein said frequency multiplying means for raising the frequencies contained in said passed component comprises a series of frequency multipliers, and a filter connected to the output of each multiplier to pass only the desired higher frequency signals, each multiplier receiving the output from the adjacent filter.

8. The transmitter defined in claim 6 wherein said frequency multiplying means comprises means for creating continuous waves of various frequencies, means for heterodyning said passed component and a higher frequency created continuous wave, means connected to the output of said heterodyning means for passing only the sum component of said heterodyning products, and means for repeatedly heterodyning said sum component with continuous waves of increasing frequencies until the resultant sum component is at the frequency level suitable for transmission.

9. The system defined in claim 8 wherein said means for creating continuous waves of various frequencies comprises a train of cascaded frequency multipliers arranged to multiply the frequency of the output from said source of continuous wave in steps to provide a series of continuous waves of increasing frequencies.

10. A single side band receiver for recovering intelligence transmitted in a single side band, said receiver comprising means for receiving a single side band high frequency transmission, means for recovering from said received transmission a single side band signal representing the original single side band as created in the transmitter, means in said receiver for creating a signal representative of said original carrier signal, demodulation means using said signal representative of the original carrier to demodulate said single side band, and means for recovering from said demodulated single side band a signal for controlling the creation of said carrier signal to synchronize said carrier signal created in said receiver with the carrier created in said transmitter.

11. The receiver defined in claim 10 wherein said means for recovering from said received single side band a single side band signal representing the original single side band as created in the transmitter comprises means for lowering the frequency of the received high frequency single side band to the lower frequency of the side band as it was created without modifying the intelligence included therein, said frequency lowering means including means for creating low frequency continuous waves, means for heterodyning the higher frequency single side band with at least one of said continuous waves, and means for passing only the frequency difference components of said heterodyning.

12. The receiver defined in claim 11 wherein said means for creating low frequency continuous waves includes individual oscillators, each of said oscillators generating signals having frequencies which bear predetermined relations to each other.

13. The receiver defined in claim 11 wherein said means for creating low frequency continuous waves includes frequency multipliers for multiplying the frequency of the signal recovered from said demodulated single side band to provide synchronized higher frequency waves of predetermined frequency relation, and further including a local oscillator having an output of the same frequency as said carrier for use in starting the receiver to provide a demodulated single side band from which said signal can be recovered, said local oscillator being removed from the circuit when said receiver is self-sustaining.

14. A transmitter for single side band transmission, said transmitter comprising a first source of continuous waves of a first low frequency, a source of digital intelligence to be transmitted, first modulating means connected to the output of said first source for phase-shift modulating said first frequency continuous waves with the output from said source of intelligence, a second source of continuous waves of a second frequency which is higher than said first frequency, second modulating means connected to the output from said second source of continuous waves and to the output of said first modulating means for amplitude modulating said second frequency continuous waves with said phase-shift modulated first frequency waves, filter means connected to the output of said second modulating for rejecting all modulation components but a single side band, means for raising the frequencies of said single side band including at least one oscillator for generating a continuous wave having a third frequency which is higher than said first and second frequencies, means for heterodyning said third frequency continuous wave with said single side band to produce signals having frequencies which are the sum of said third frequency and the frequencies of said single side band, and filter means connected to the output of said heterodyning means for rejecting all but said sum frequencies.

15. The transmitter defined in claim 14 further including a variable attenuator connected to the output of said third source of continuous waves to attenuate at least some of the output from said third source, and means for connecting the output from said attenuator to the input to said heterodyning means whereby coninuous waves having said second frequency at an amplitude smaller than the amplitude of said single side band are included in the transmission from said transmitter.

16. A single side band transmitter comprising a source of continuous waves of a first frequency, means for modifying the output from said source in accordance with intelligence to be transmitted, frequency multiplying means connected to the output of said source to multiply the frequency of at least a portion of the continuous wave of said first frequency to a wave of second frequency, modulator means having the signal output from said modifying means and the wave of said second frequency applied thereto to modulate said wave of second frequency with the intelligence modified wave of said first frequency, filter means connected to the output of said modulator means to pass only the sum component of said modulation products, and means for raising the frequencies of the signals in said passed component comprising a series of cascaded frequency multipliers, second filter means connected to the output of each of said frequency multipliers to pass only the desired harmonics of the signals generated in said frequency multipliers, said signal being multiplied until the frequency level for transmission is reached, and means for raising the amplitude of the frequency multiplied signals to a level suitable for transmission.

17. A single side band transmitter comprising a single source of continuous waves at a first frequency, means for phase-shift modifying at least a portion of the output from said source in accordance with digital intelligence to be transmitted, first means connected to the output of said source to increase the frequency of at least a portion of the output from said source to a second frequency, modulator means connected to the output of said modifying means and to the output of said first means for increasing the frequency for modulating the second frequency output from said first frequency increasing means with the modified first frequency wave, means connected to the output from said modulator means to pass only those signals which are the sum of said modified first frequency wave and said second frequency wave, and means for increasing the frequencies of said sum signals to the frequency level suitable for transmission comprising at least second frequency multiplier means connected to the output from said first frequency multiplier means output to increase the frequency of said second frequency wave to a third frequency which is higher than said first and second frequencies, and means receiving said sum signals and said third frequency wave for converting said sum signals representing a second sum of the frequency of said third wave and said sum signals.

18. A receiver for single side band transmission, said receiver comprising means for receiving a single side band and a signal representing an attenuated carrier, first oscillator means for generating continuous waves having a first frequency, first means for heterodyning said received signals with said first frequency waves, first filter means for passing only the first difference signals of the received signals and said first waves, second oscillator means for generating continuous waves having a second frequency lower than said first frequency, second heterodyning means for heterodyning said first difference signals and said second frequency waves, second filter means for passing the signals representing the difference between said second frequency and said first difference signals, third filter means connected to the output from said second heterodyning means for passing only said attenuated carrier, and means connected to the output from said third filter means to control the operation of said first oscillator means to reproduce said carrier and said single side band.

19. A single side band receiver comprising means for receiving a single side band transmission, a first frequency multiplier for multiplying the frequency of a continuous wave applied to its input to a first frequency, heterodyning means connected to the outputs of said receiving means and of said first multiplier for heterodyning said received signals with the first frequency wave, first filter means connected to the output of said first heterodyning means to pass only first signals representative of the difference between said first frequency wave and the received signals, a second frequency multiplier for multiplying the frequency of a continuous wave applied to its input to a second frequency, means for connecting the output from said second frequency multiplier to the input of said first multiplier, second heterodyning means connected to the outputs of said second frequency multiplier and said first filter means to heterodyne said second frequency wave and said first difference signals, second filter means connected to the output of said second heterodyning means to pass only second signals representing the frequency difference between said second frequency wave and said first difference signals, and means connected to the output of said second filter means for deriving from said second difference signals a third frequency continuous wave representative of the original carrier, the output of said means for deriving said third frequency wave being connected to the input to said second multiplier.

20. The receiver defined in claim 19 wherein said means for deriving said third frequency wave comprises means for demodulating said second difference signals, and means for recovering components of said single side band received by the receiver.

21. The receiver defined in claim 20 further including an oscillator adapted to generate a continuous wave having the frequency of the original carrier wave, and means to selectively connect said oscillator to the input of said second frequency multiplier when said receiver first receives signals.

References Cited in the file of this patent

UNITED STATES PATENTS

| | | |
|---|---|---|
| 1,849,884 | Peterson | Mar. 15, 1932 |
| 2,045,796 | Plebanski | June 30, 1936 |
| 2,114,333 | Conklin | Apr. 19, 1938 |
| 2,283,575 | Roberts | May 19, 1942 |
| 2,323,698 | Armstrong | July 6, 1943 |
| 2,399,469 | Cook | Apr. 30, 1946 |
| 2,455,959 | Van Der Mark et al. | Dec. 14, 1948 |
| 2,572,958 | Spacek | Oct. 30, 1951 |
| 2,852,749 | Miedke | Sept. 16, 1958 |
| 2,907,831 | De Jager et al. | Oct. 6, 1959 |
| 2,999,154 | Krause | Sept. 5, 1961 |
| 3,084,328 | Groeneveld et al. | Apr. 2, 1963 |

FOREIGN PATENTS

| | | |
|---|---|---|
| 113,285 | Australia | June 19, 1941 |